United States Patent
Purvis et al.

(10) Patent No.: US 10,227,047 B2
(45) Date of Patent: Mar. 12, 2019

(54) ADJUSTABLE RECEPTACLE HOLDER FOR A VEHICLE

(71) Applicant: David Purvis, DeLand, FL (US)

(72) Inventors: David Purvis, DeLand, FL (US); Kris Stone, Orange City, FL (US)

(73) Assignee: David Purvis, DeLand, FL (US)

( * ) Notice: Subject to any disclaimer, the term of this patent is extended or adjusted under 35 U.S.C. 154(b) by 0 days.

(21) Appl. No.: 15/913,717

(22) Filed: Mar. 6, 2018

(65) Prior Publication Data

US 2018/0257576 A1    Sep. 13, 2018

Related U.S. Application Data

(60) Provisional application No. 62/467,879, filed on Mar. 7, 2017.

(51) Int. Cl.
| | | |
|---|---|---|
| *B60R 9/00* | (2006.01) | |
| *B60P 7/08* | (2006.01) | |
| *B65D 71/72* | (2006.01) | |
| *B67B 7/16* | (2006.01) | |

(52) U.S. Cl.
CPC ............... *B60R 9/00* (2013.01); *B65D 71/72* (2013.01); *B60P 7/08* (2013.01); *B67B 7/16* (2013.01)

(58) Field of Classification Search
CPC ......... B60P 7/08; B60P 7/0807; B60P 7/0982; B60R 7/02; B60R 2011/0036; B60R 9/00; F16M 13/02

USPC ... 224/402, 403, 404, 42.32, 42.4, 270, 539, 224/542, 42.38, 536; 410/126, 122, 121; 248/316.4, 316.6; 211/184

See application file for complete search history.

(56) References Cited

U.S. PATENT DOCUMENTS

| | | | | |
|---|---|---|---|---|
| 1,312,562 A | * | 8/1919 | Morse | B60R 9/02 224/42.38 |
| 1,356,328 A | * | 10/1920 | Worthington | B60R 9/02 224/42.38 |
| 1,579,770 A | * | 4/1926 | Kelly | B60R 9/02 224/42.38 |
| 3,589,659 A | | 6/1971 | Larkin | |
| 3,601,295 A | * | 8/1971 | Lowe | B60R 9/06 224/42.38 |
| 3,815,388 A | * | 6/1974 | Nichol | E05B 73/00 224/42.38 |
| 4,027,892 A | * | 6/1977 | Parks | B60P 7/0815 248/220.31 |
| 4,538,737 A | * | 9/1985 | Delaney | B60P 7/0892 206/560 |
| 4,842,460 A | * | 6/1989 | Schlesch | B60P 7/0892 188/32 |
| 4,941,784 A | * | 7/1990 | Flament | B60R 7/02 211/184 |
| 4,955,771 A | * | 9/1990 | Bott | B60P 7/0892 410/104 |

(Continued)

*Primary Examiner* — Justin M Larson
(74) *Attorney, Agent, or Firm* — MacMillan, Sobanski & Todd, LLC

(57) ABSTRACT

An adjustable retainer for attaching a receptacle, such as a thermal cooler, to a vehicle includes a frame for securing to a vehicle, such as a truck bed. Opposing jaws are movable in guide slots in the frame. One jaw may be manually positioned in a guide slot having hooks, while the other jaw is movable by a linear actuator secured to the frame. The jaws allow optimum positioning of the receptacle and create a vice-like retaining mechanism.

20 Claims, 14 Drawing Sheets

(56) References Cited

U.S. PATENT DOCUMENTS

| | | | |
|---|---|---|---|
| 5,080,250 A | 1/1992 | Dickinson et al. | |
| 5,149,032 A * | 9/1992 | Jones | A47G 23/0225 248/154 |
| 5,161,700 A * | 11/1992 | Stannis | B60R 7/02 211/175 |
| 5,193,700 A * | 3/1993 | Lyman | B60P 7/12 206/386 |
| 5,255,832 A | 10/1993 | Christensen | |
| 5,588,631 A | 12/1996 | Yee | |
| 5,730,344 A | 3/1998 | Mauch | |
| 5,848,744 A | 12/1998 | Dischner et al. | |
| 5,964,492 A | 10/1999 | Lyon | |
| 5,971,685 A * | 10/1999 | Owens | B60P 7/15 410/122 |
| 6,012,885 A * | 1/2000 | Taylor | B60P 7/0892 410/121 |
| 6,116,673 A | 9/2000 | Clonan | |
| 6,176,657 B1 * | 1/2001 | Romph | B60P 7/0892 410/121 |
| 6,227,513 B1 * | 5/2001 | Richard | A47G 7/025 211/43 |
| 6,241,137 B1 | 6/2001 | Corr | |
| 6,375,054 B1 * | 4/2002 | Lance | B60P 3/14 224/404 |
| 6,481,604 B1 | 11/2002 | Beene et al. | |
| 6,511,270 B1 * | 1/2003 | Burke | B60P 7/0807 410/101 |
| 6,799,927 B2 * | 10/2004 | Wheatley | B61D 45/001 410/104 |
| 6,814,383 B2 | 11/2004 | Reed, III et al. | |
| 7,862,269 B2 * | 1/2011 | Kovie | B60P 3/14 296/41 |
| 8,083,198 B2 * | 12/2011 | Stabler | F16M 11/16 211/184 |
| 8,281,967 B2 | 10/2012 | Evans | |
| 8,544,708 B2 | 10/2013 | Maimin | |
| 8,567,650 B2 | 10/2013 | Read et al. | |
| 8,622,266 B2 * | 1/2014 | McMillan | B60R 3/007 224/323 |
| 8,622,359 B2 | 1/2014 | Carnevali | |
| 8,662,558 B1 | 3/2014 | Kolb et al. | |
| 8,701,954 B1 * | 4/2014 | Weinmeister | B60R 7/10 206/8 |
| 8,814,246 B2 | 8/2014 | Weller | |
| 8,967,438 B2 | 3/2015 | Russell et al. | |
| 9,022,267 B2 * | 5/2015 | Wisselmann | B60R 11/0241 224/552 |
| 9,381,871 B2 * | 7/2016 | Murray | B60R 5/04 |
| 2007/0045368 A1 * | 3/2007 | Lavelle | B60R 9/00 224/524 |
| 2007/0152003 A1 | 7/2007 | Dollar, Jr. | |
| 2007/0154276 A1 | 7/2007 | Dollar, Jr. | |
| 2008/0272165 A1 * | 11/2008 | McMillan | B60R 9/00 224/408 |

* cited by examiner

US 10,227,047 B2

ADJUSTABLE RECEPTACLE HOLDER FOR A VEHICLE

REFERENCE TO RELATED APPLICATION

This application claims priority from U.S. Provisional Application Ser. No. 62/467,879, filed Mar. 7, 2017, the disclosures of which are hereby incorporated by reference.

FIELD OF THE INVENTION

The present invention generally relates to receptacles such as thermal coolers and to their attachment to vehicles.

BACKGROUND OF THE INVENTION

Receptacles are often carried on vehicles, such as a truck bed, for easy access. Thermal coolers are a prime example of such receptacles for keeping cold refreshments and food on hand. Coolers are often positioned in numerous places and on various vehicles, such as trucks, boats, all-terrain vehicles, etc. One common problem is that coolers tend to shift around when a vehicle is moved or it is accessed. For years, the common method for securing a cooler has been to use devices like straps, bungee cords, rope, etc. but these methods and devices have proven to be awkward, inconvenient, and not always effective.

SUMMARY OF THE INVENTION

The present invention is a frame for holding a thermal cooler or other receptacle such as a toolbox, container, etc. The frame can be positioned in a truck bed or on any vehicle for the purpose of retaining a receptacle in place. The frame may be secured to the vehicle by a means of mechanical fastening, like bolts. The frame has upwardly extending jaws movably secured to the frame. The jaws are movable along generally aligned guide slots in the frame. Preferably, one jaw may be positioned manually on the frame within a guide slot having spaced positioning hooks, while the opposite jaw is movable along a guide slot by a linear actuator. Preferably, each jaw has a top plate adjacent the top surface of the frame and a bottom plate positioned below the frame slot connected by bolts, which ride in the slot.

DESCRIPTION OF PREFERRED EMBODIMENTS

Figure 1:
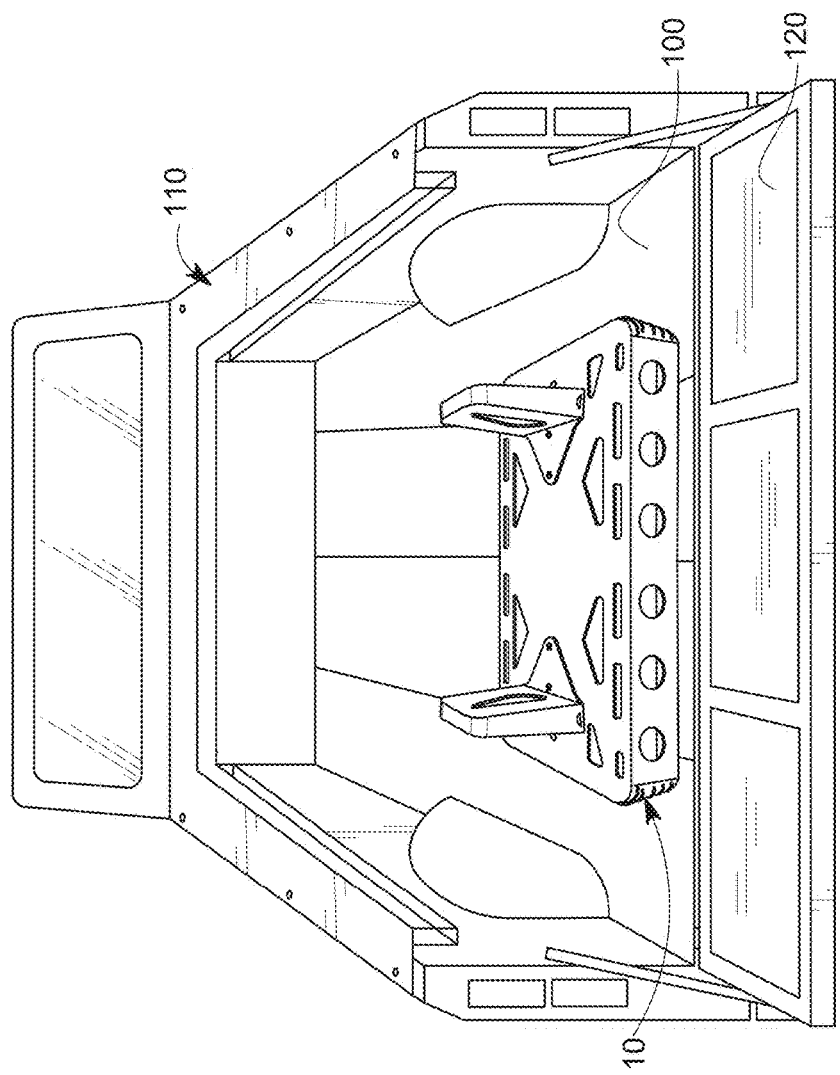
FIG. 1 is a perspective view of a truck bed with a receptacle holder of the present invention.

FIG. 1 shows an adjustable receptacle holder 10 of the present invention mounted on a truck bed 100. The truck 100 is a pickup truck with a typical bed 100, tailgate 120, etc. The holder 10 is mounted near the back edge of the truck bed 100 for easy access, but alternatively may be mounted anywhere on the bed. It is even possible to mount the retainer on the tailgate 120 temporarily or even more permanently provided there is clearance for lifting the tailgate. Of course, the holder 10 may be mounted on various other vehicles, such boats, ATVs, etc., as well. A cooler 130 (shown in phantom) is secured in the holder 10. The holder can easily secure coolers of various sizes, such as 20 to 50 quart capacities, for example.

Figure 2:
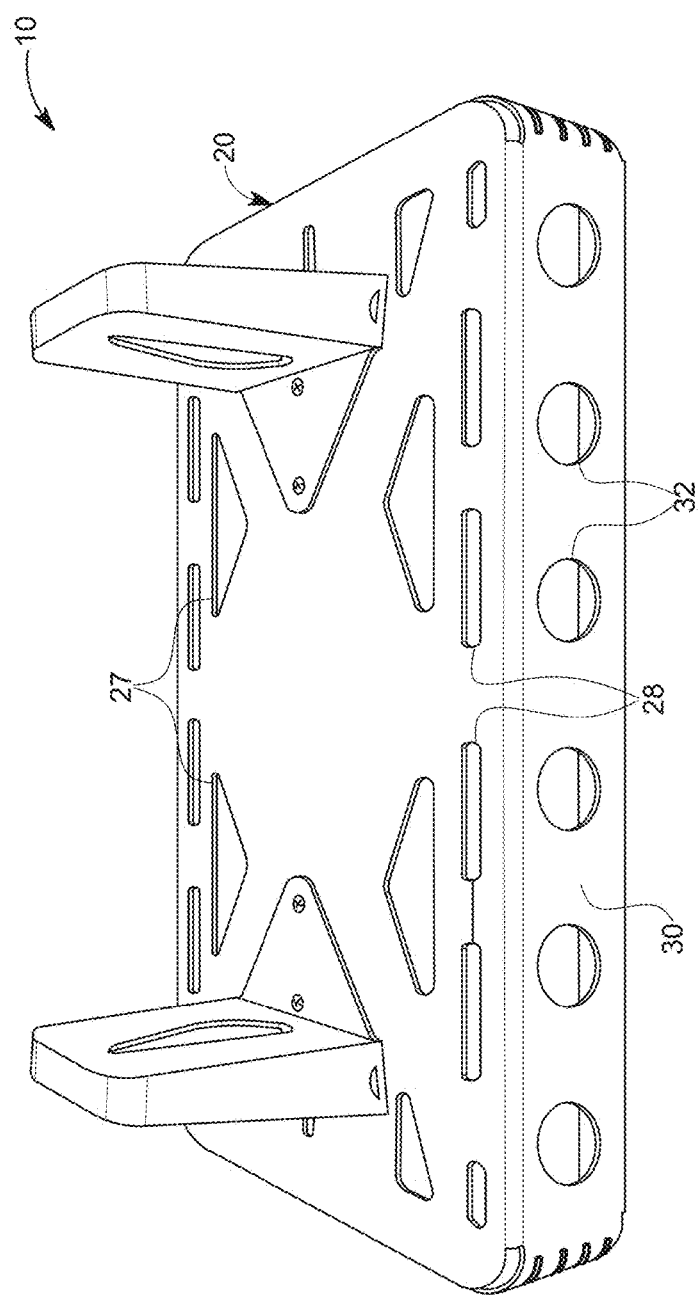
FIG. 2 is a perspective view of the receptacle holder of FIG. 1 with the jaws in a relatively narrow position.
Figure 3:
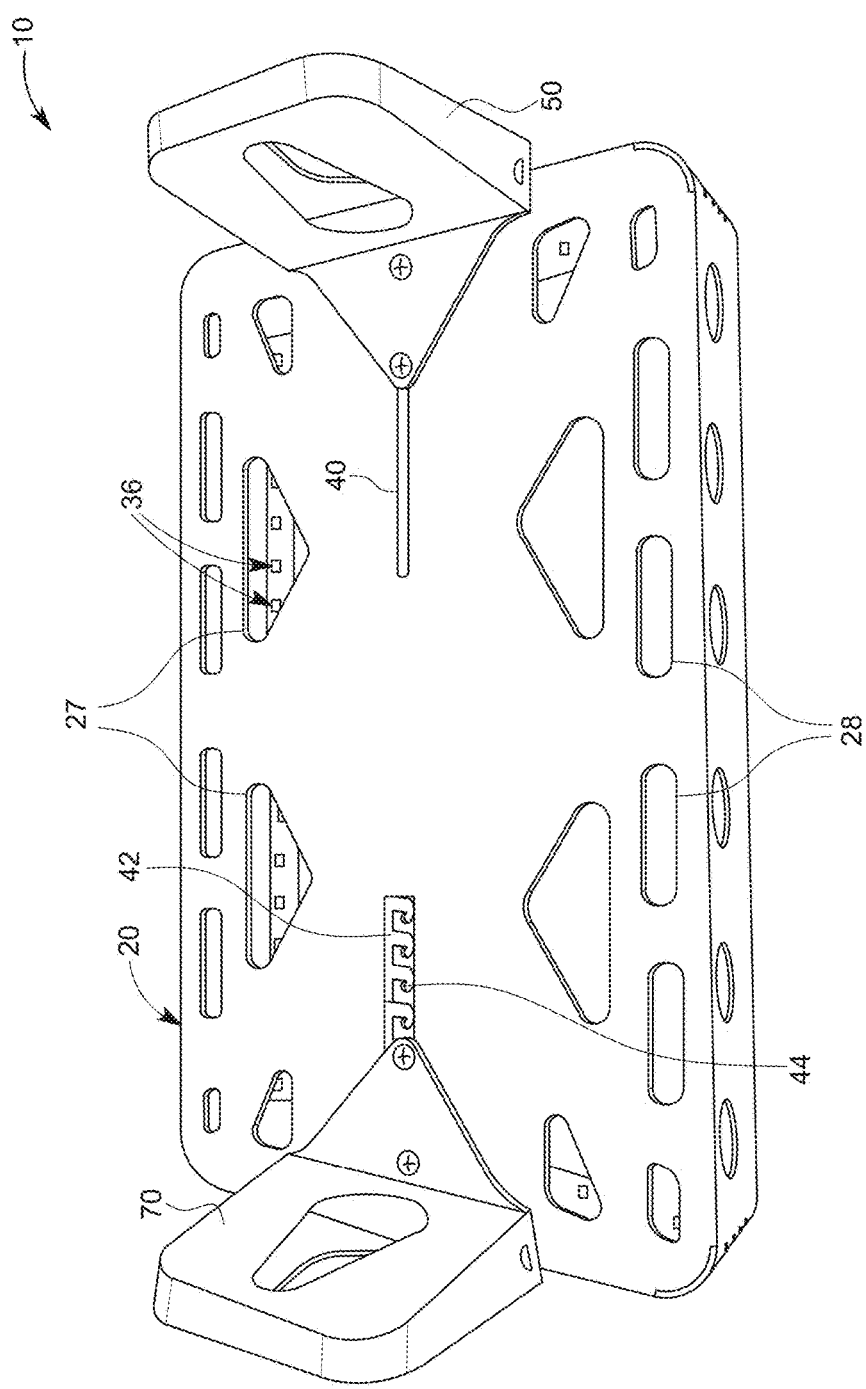
FIG. 3 is a perspective view of the receptacle holder of FIG. 1 with the jaws in a relatively wide position.

Referring to FIGS. 2 and 3, the holder 10 includes a generally rectangular frame member 20 and opposing jaws 50 and 70. The frame 20 and jaws may be formed from ⅛ inch 5052 plate aluminum, for example. The frame and jaws may be powder coated for an attractive and long lasting finish. The jaws are movable in guide grooves or tracks as will be described herein. FIG. 2 illustrates the opposed jaws in their closest orientation, which FIG. 3 illustrates the jaws in there most open configuration.

Figure 4:
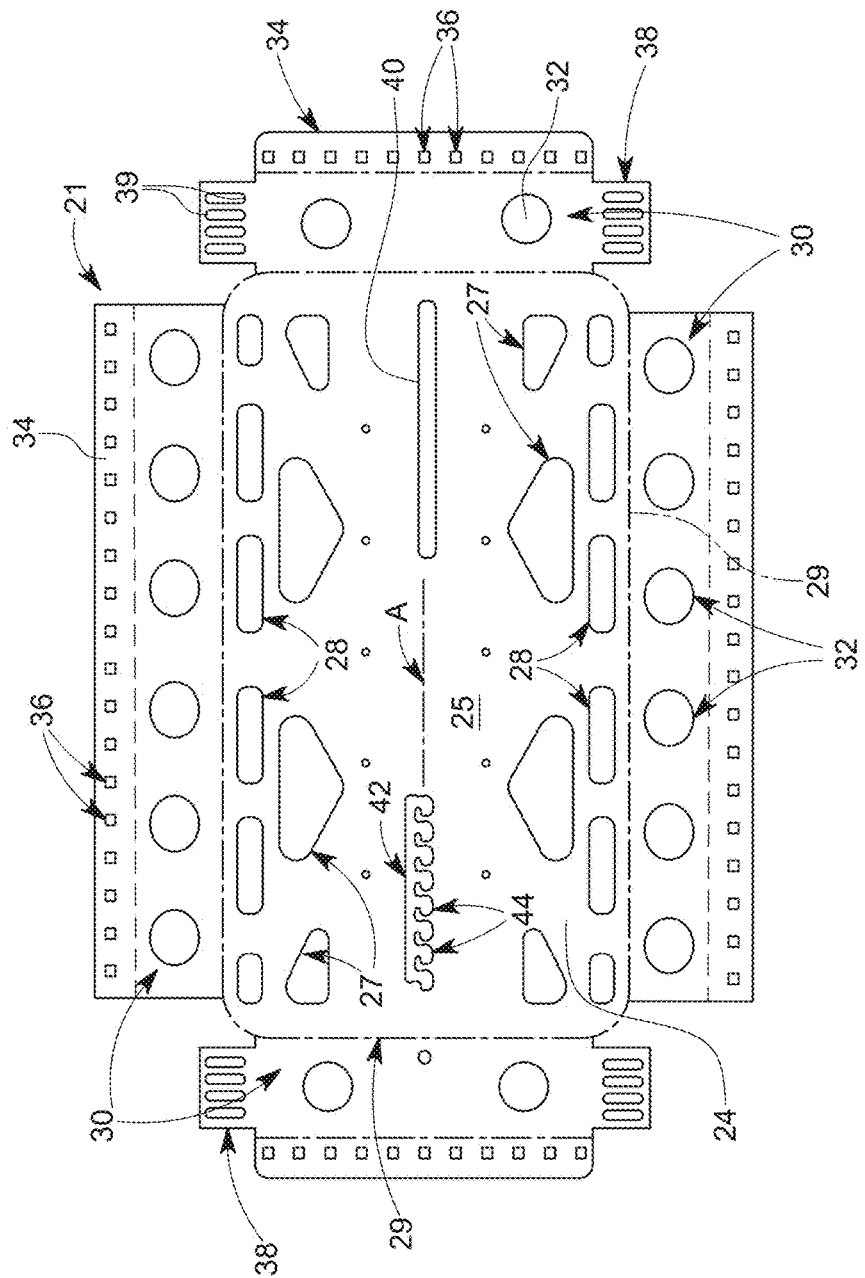
FIG. 4 is a plan view of a stamping from which the receptacle holder frame is made.

Referring to FIG. 4, the frame 20 includes a base plate 24 having a top surface 25. The base plate includes a first elongated guide slot 40 and a second elongated guide slot 42. In one preferred embodiment, the first guide slot 40 has a length of 8 3/16 inches and a width of 5/16 inches. Of course, the slot length may be from 2 to 12 inches and the width from ¼ to ½ inches for various holder designs. The second guide slot 42 has a series of linearly aligned round hooks 44, each hook having a diameter of 5/16 inches to match the general diameter of jaw pins which are positioned with the hooks for positioning the second jaw as will be explained herein. The first and second guide slots are linearly aligned along an axis A, with the centers of the hooks 44 lying along axis A.

Base plate 24 includes several holes or openings. Rounded triangular shaped openings 27 are spaced around the periphery of the base plate 24. Oblong openings 28 are spaced around the periphery of the base plate 24 between the triangular shaped openings 27 and the base plate edges 29. These openings are provided to facilitate securing the frame to a vehicle as will be described.

The stamping 21 includes first flanges 30 which are bent downwardly approximately 90 degrees away from the top surface 25 of the base plate 24. The first flanges 30 provide spacing between the base plate 24 and any vehicle to which the holder will be secured. Each of the first flanges 30 has a series of spaced circular openings 32 to provide access to the space under the base plate. The ends 38 of two of the flanges 30 are bent to create a rounded edge to the base plate. The ends have a series of drainage slots 39.

The stamping 21 also includes second flanges 34 which are bent inwardly underneath the base plate 24 approximately 90 degrees from the first flanges 30, thereby orienting the second flanges generally parallel to the base plate 24. Each of the four second flanges 34 has a series of spaced carriage bolt openings 36. The carriage bolt openings 36 are characterized by their square shape to accept carriage bolt heads. In a preferred embodiment, the openings 36 are sized to accept 5/16 inch carriage bolts, but bolt openings of any size may be suitable for other embodiments. The square openings 36 are oriented to accept U-bolts.

Figure 5:
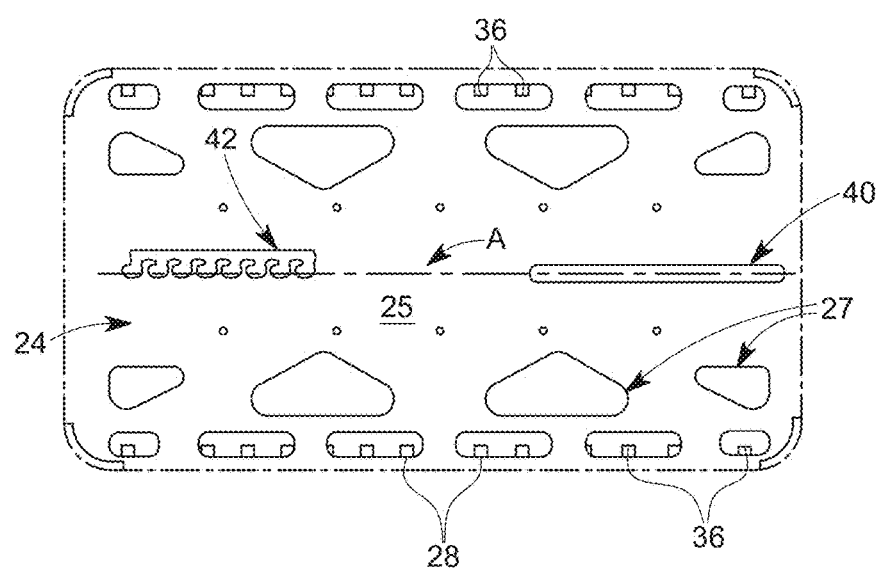
FIG. 5 is a plan view of the top surface of the frame base plate.

Referring to FIG. 5, when the flanges 30 and 34 are bent into place from the stamping 21, the second flanges will be positioned generally directly under the oblong openings 28 of the base plate 24. This facilitates mounting of the holder to a vehicle, as tools will be able to reach through the openings 28 to access the carriage bolt holes 36. In addition, the rounded triangular openings 27 will also allow access to the carriage bolt openings 36 and to the underside of the base plate 24.

Figure 6:
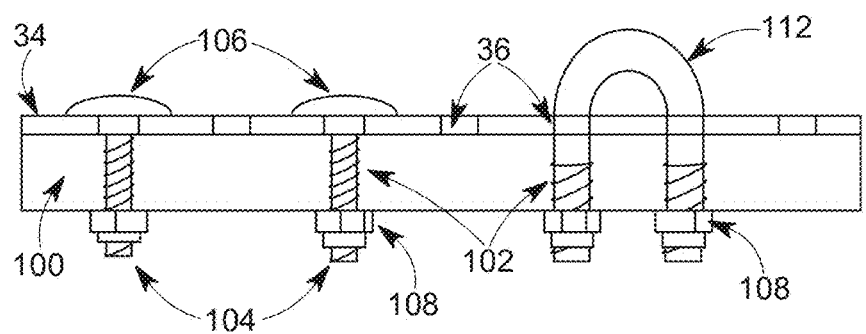
FIG. 6 is a cross sectional view of a portion of the frame attached to a truck bed.

FIG. 6 illustrates a preferred method of securing the holder to a vehicle. Drill holes 102 are provided in truck bed 100, aligned and spaced to match the carriage bolt openings 36 in the second flange 34. The second flange 34 is positioned over the bolt openings 102, and 5/16 inch carriage bolts 104 are inserted in the carriage bolt openings 36, thought the truck bed drill holes 102. The square carriage bolt heads 106 are secured from rotation by bolt holes 36. Threaded nuts 108 may be tightened from underneath the bed 100 while the bolts are secured from rotation buy the bolt holes 36. The carriage bolt holes 36 are also spaced to facilitate use of U-bolts 112, each of which may pass through two drill holes 102 and be secured by nuts 108.

Figure 7:
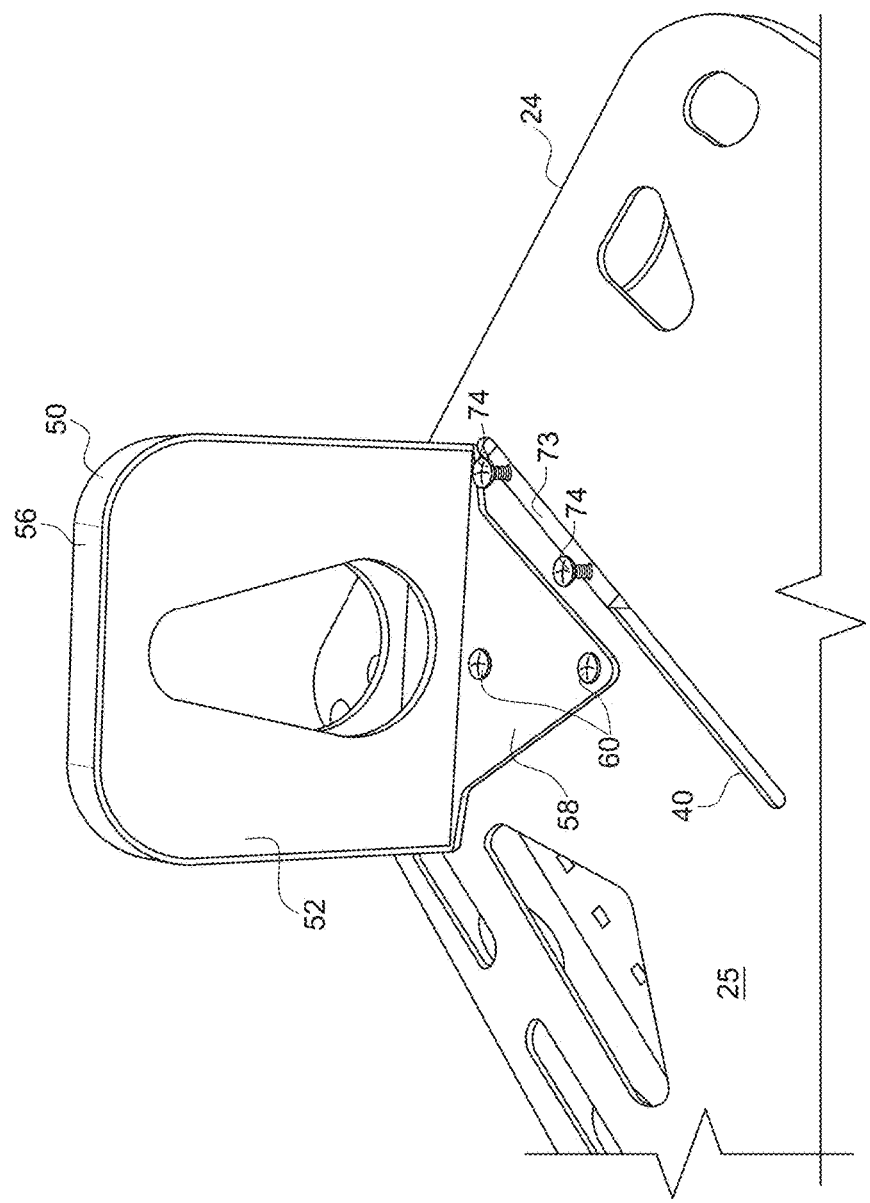
FIG. 7 is a perspective view of the partially disassembled first jaw.

The first jaw 50 and second jaw 70 are identical. The size and shape of the jaws may be varied to fit specific receptacles, such as thermal coolers, toolboxes, etc. which may have indentations or specific end shapes. Referring to FIG. 7, the first jaw 50 has an inside face 52 extending generally perpendicular to the base plate top surface 25. The surface 52 is coated with an anti-skid pad such as neoprene or poly-chloroprene rubber, which can be from about 1/8" to about 1" thick. The anti-skid pad can be attached by an adhesive or with countersunk flat head cap screws (not shown).

FIG. 7 also shows the first guide slot 40 and a first guide block 73 positioned within the guide slot to assist in guiding the jaw along the guide slot as will be explained herein. A second identical guide block 73 is also positioned within the second guide slot 42 for similar purposes.

Figure 8:
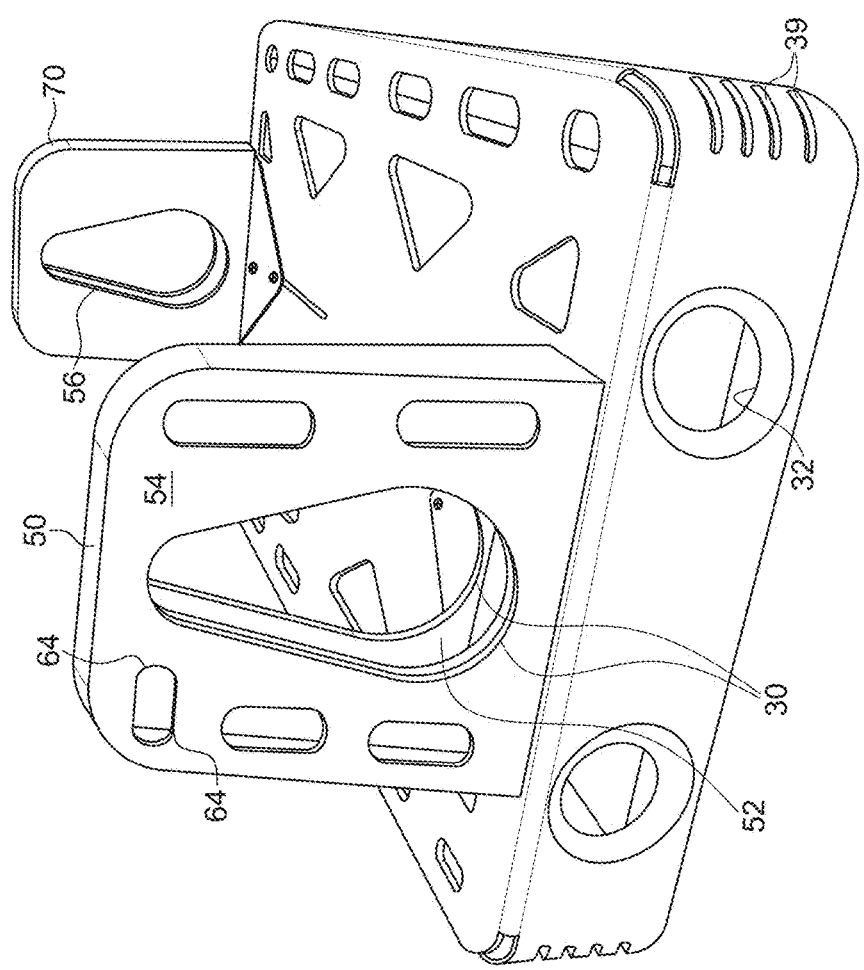
FIG. 8 is a perspective first jaw end view of the receptacle holder of FIG. 1.

As shown in FIG. 8, the first jaw has an outer surface 54 spaced from the inner surface 52. The outer surface 54 is slightly skewed inwardly relative to the inner surface 52. A three-sided peripheral bridge 56 connects the inner surface 52 to the outer surface 54 above the top surface 25 of the base. The bridge 56 is slightly narrow at the top of the jaws to accommodate the slight skewed orientation of the inner and outer surfaces. The first jaw 50 includes a base plate 58 secured to the bottom of both inner and outer surfaces. The base plate 58 includes two holes 60 for drivingly engaging pins connected to a linear actuator as will be described.

Both inner and outer surfaces of the first jaw 50 have large aligned teardrop shaped openings 62 provided for access to any receptacle held within the holder. The large openings also provide a space for accessories such as a drain plug for a cooler, and allow easy removal of a cooler with a drain plug but tilting the cooler. The first jaw end surface also includes an opening 64 with an inwardly bent flange 66 forming a bottle opener.

Figure 9:
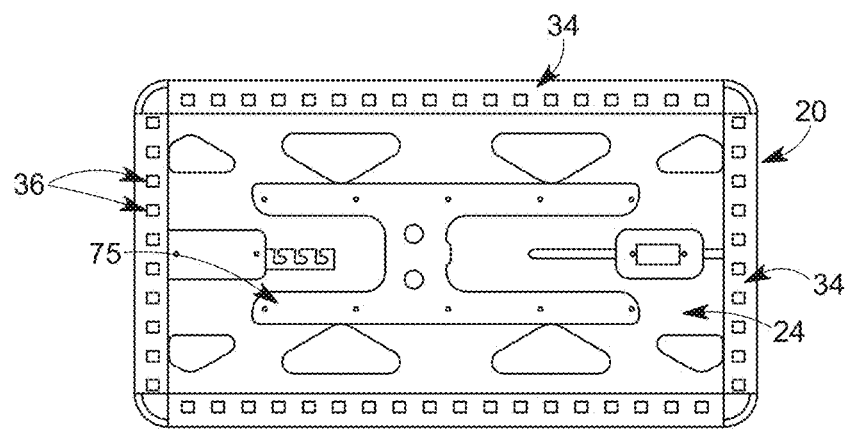
FIG. 9 is a plan view of the underside of the frame and attached linear actuator bracket.
Figure 10:
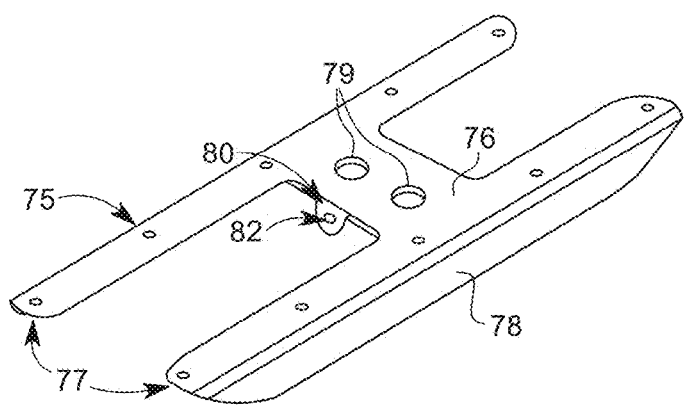
FIG. 10 is a perspective view of the bracket of FIG. 9.

Referring to FIGS. 9 and 10, a bracket 75 is attached to the underside of the frame base plate 24 with ten 8-32×1/4 inch flat socket head screws 74. The bracket 75 is formed from 1/8 inch 5052 aluminum and has a flat top surface 76, which abuts the flat bottom surface of the base plate 24. The bracket has two parallel legs 77, each having a downwardly extending flange 78. A central section of the bracket has two holes 79 for aesthetics. The bracket also includes a centrally located downwardly extending tab 80, which defines an actuator guide hole 82.

Figure 11:
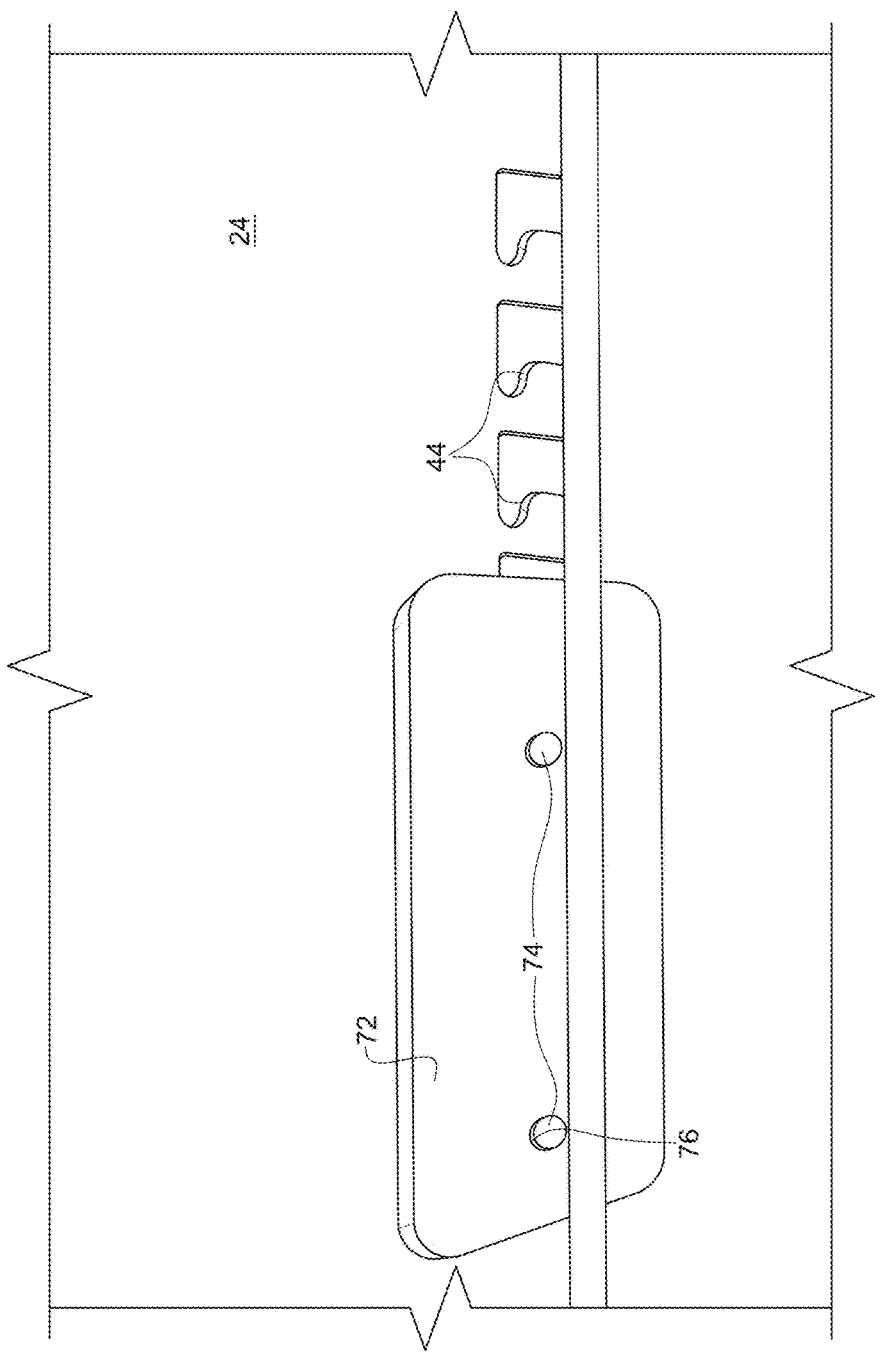
FIG. 11 is a perspective view of the bottom plate attached to the second jaw.

FIG. 11 shows the underside of base plate 24 and a slide and lock anchor plate 72. The anchor plate 72 is attached to the second jaw 70 by two pins 74, such as 1/4-20×5/8 flat socket head screws, which are threaded into 1/4-20 inch threaded holes 76 in the plate 72. The pins 74 pass through the holes 60 in the jaw top plate 58 (FIG. 7) and are screwed into the slide and lock anchor plate 72. The anchor plate holes 76 are spaced to match the spacing of the jaw top plate holes 60 and to match the spacing of the guide slot hooks 44. The guide block 73 (FIG. 7) positioned within the guide slot 42 has two holes through with the two pins 74 pass. The guide block 73 has the same thickness as the base plate 24 and provides guidance for the jaw to move along the guide slot 42.

Figure 12:
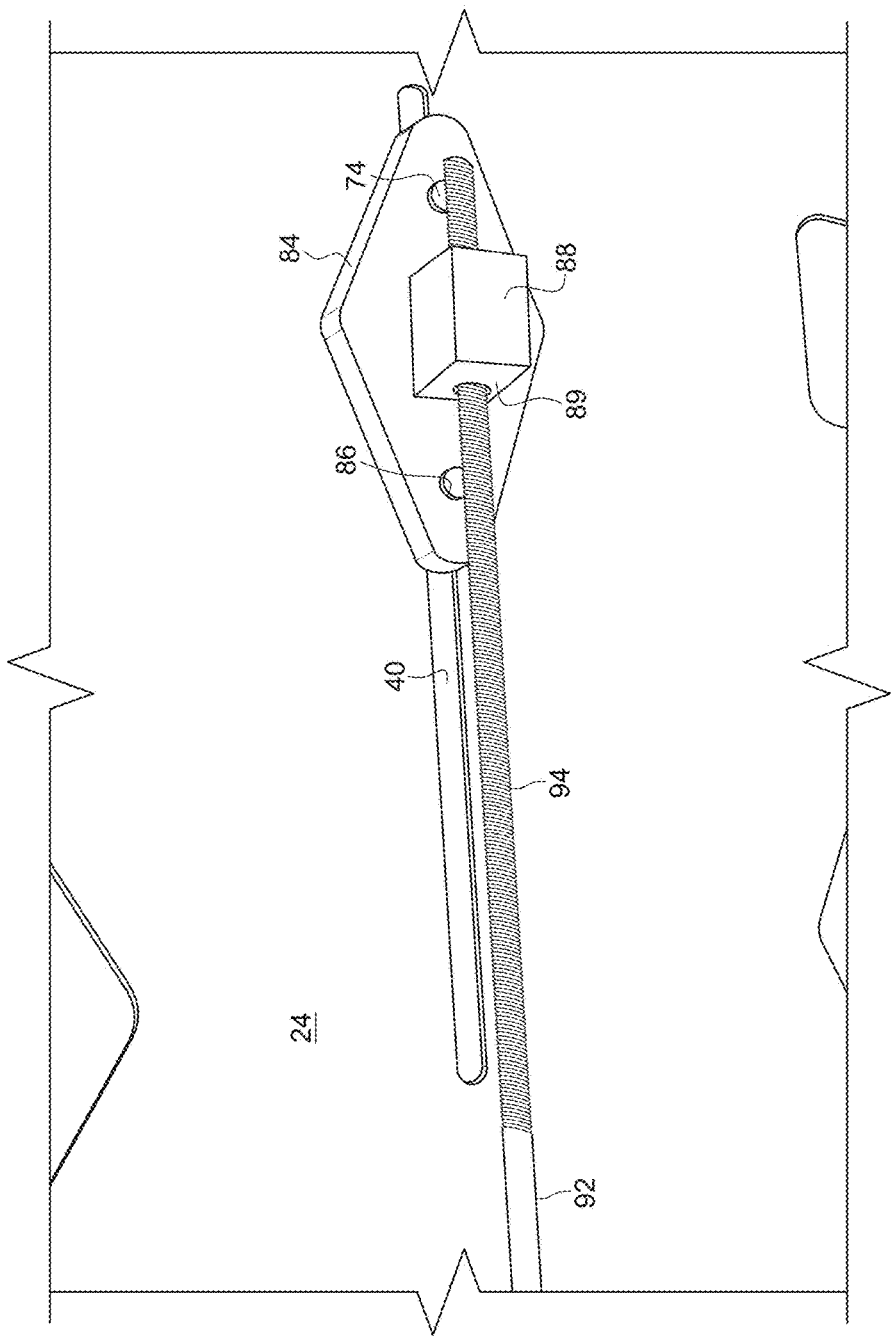
FIG. 12 is a perspective view of the bottom plate and screw block attached to the first jaw.

FIG. 12 shows the underside of base plate 24 and a linear drive screw block 84. The screw block 84 is attached to the first jaw 50 by two pins 74 which are threaded into threaded holes 86 in the plate 84. The pins 74 pass through the holes 60 in the jaw top plate 58 (FIG. 7) and are screwed into the screw block 84. The screw block holes 86 are spaced to match the spacing of the jaw base plate holes 60. The guide block 73 (FIG. 7) is positioned within the guide slot 40. The guide block 73 has two holes through with the two pins 74 pass. The guide 73 has the same thickness as the base plate 24 and provides guidance for the jaw to move within the guide slot 40. The guide block 73 has a 3/16 inch raised guide to allow clearance of base plate 24, which is 1/8 inch thick. The screw block 84 includes a boss 88, which includes a threaded bore 89. The bore 89 is threaded to match the screw drive actuator screw threads 94.

Figure 13:
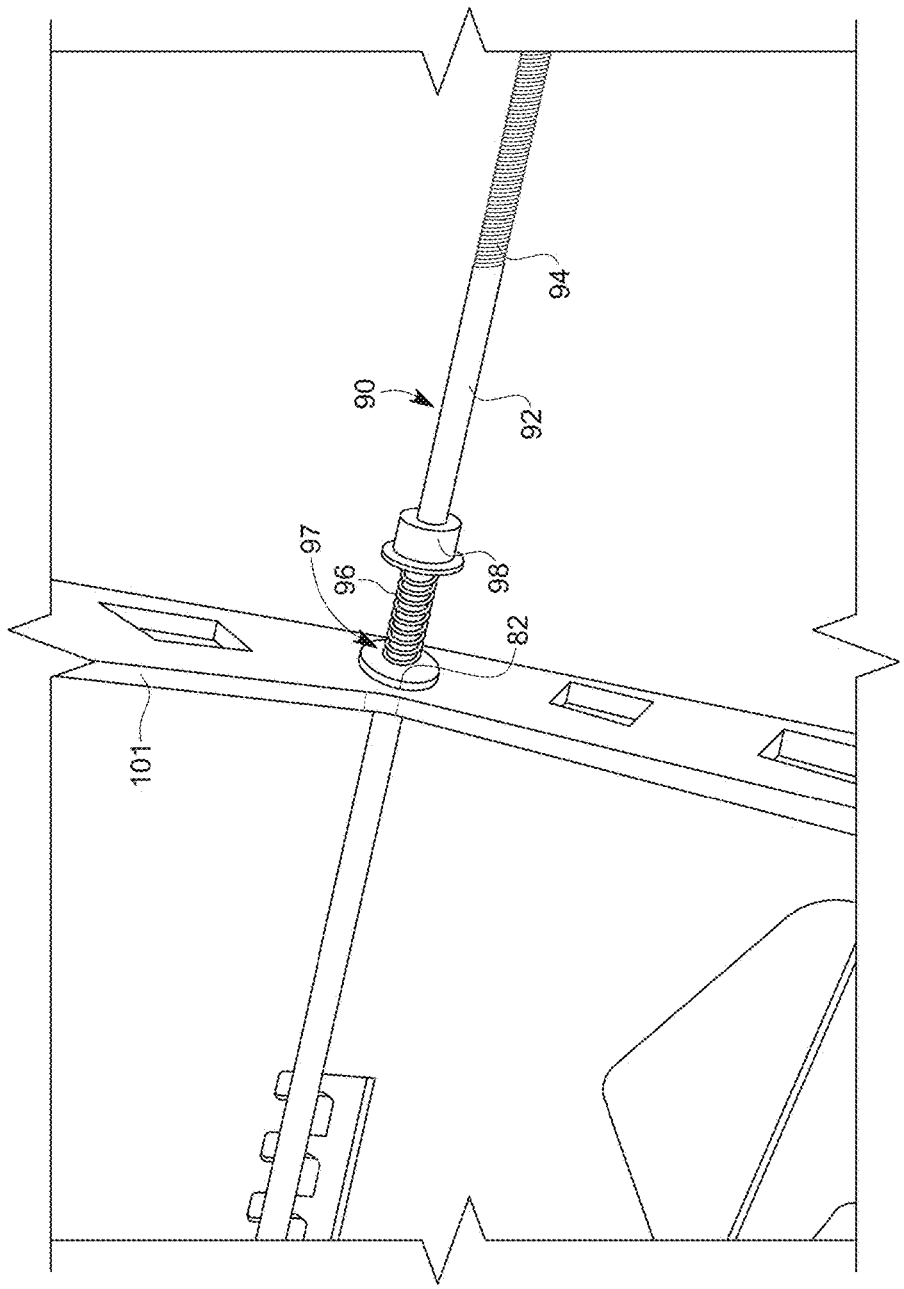
FIG. 13 is a perspective view of the linear actuator and an alternative center support truss.

FIG. 12 shows a linear actuator 90 including a generally cylindrical rod 92 having a threaded end portion 94. The threaded end portion 94 drivingly engages the first jaw 50 through the screw block 84. FIG. 13 shows an alternative central support for the actuator rod 92. The support includes a truss 101 welded to the underside of the base plate 24. The rod 92 passes though the central guide hole 82' in the truss 101. A one and a half inch compression coil spring 96 is biased between the truss 101 and a bushing 98 rigidly attached to the rod 92. This arrangement is the same when the bracket flange 80 (FIG. 10) is used instead of the truss 101. The spring 96 is compressed when the cam lever of the linear actuator is pressed into the closed position, which moves the first jaw toward the second jaw, and biases the jaws toward a release position when the cam lever actuator is opened.

Figure 14:
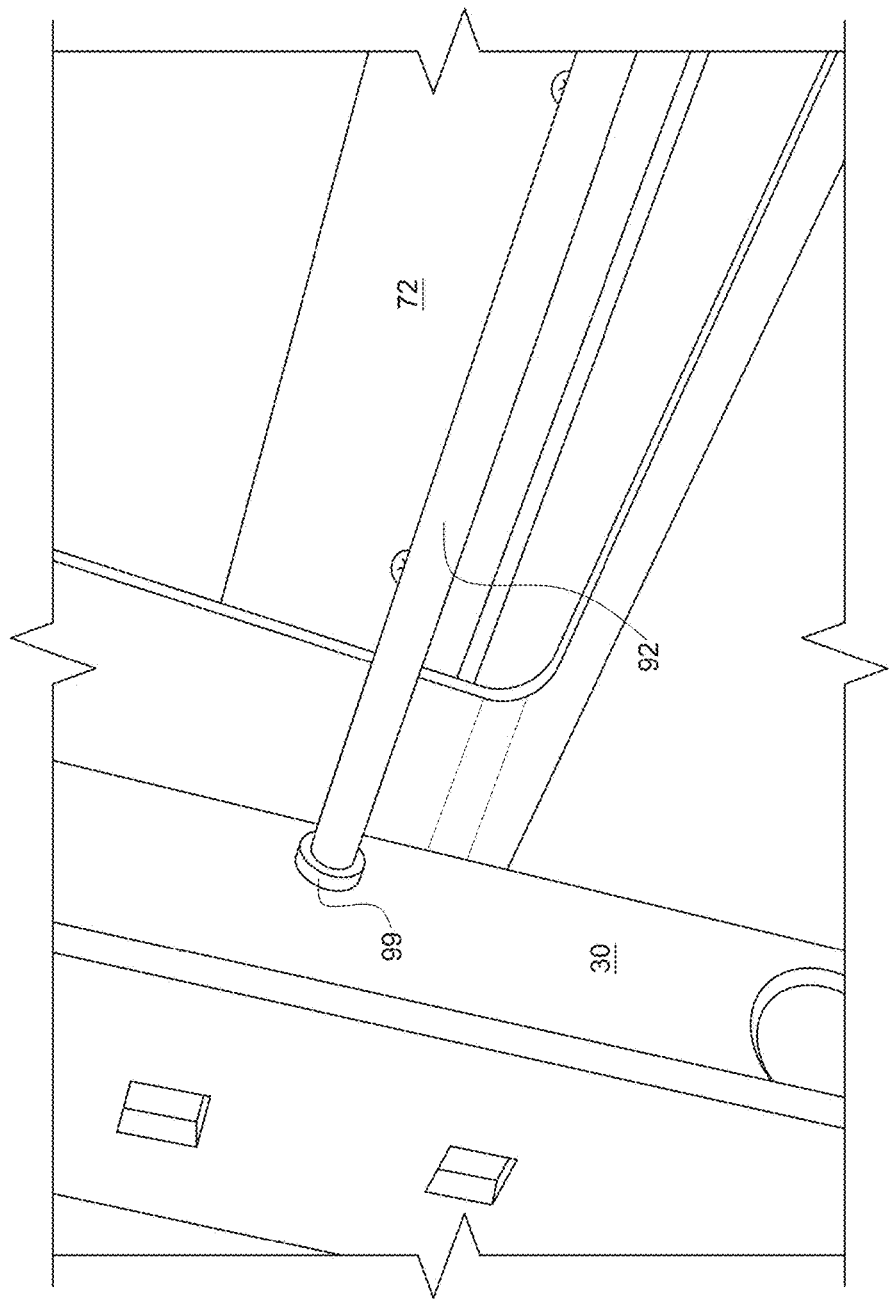
FIG. 14 is a perspective view of the linear actuator and frame bushing.
Figure 15:
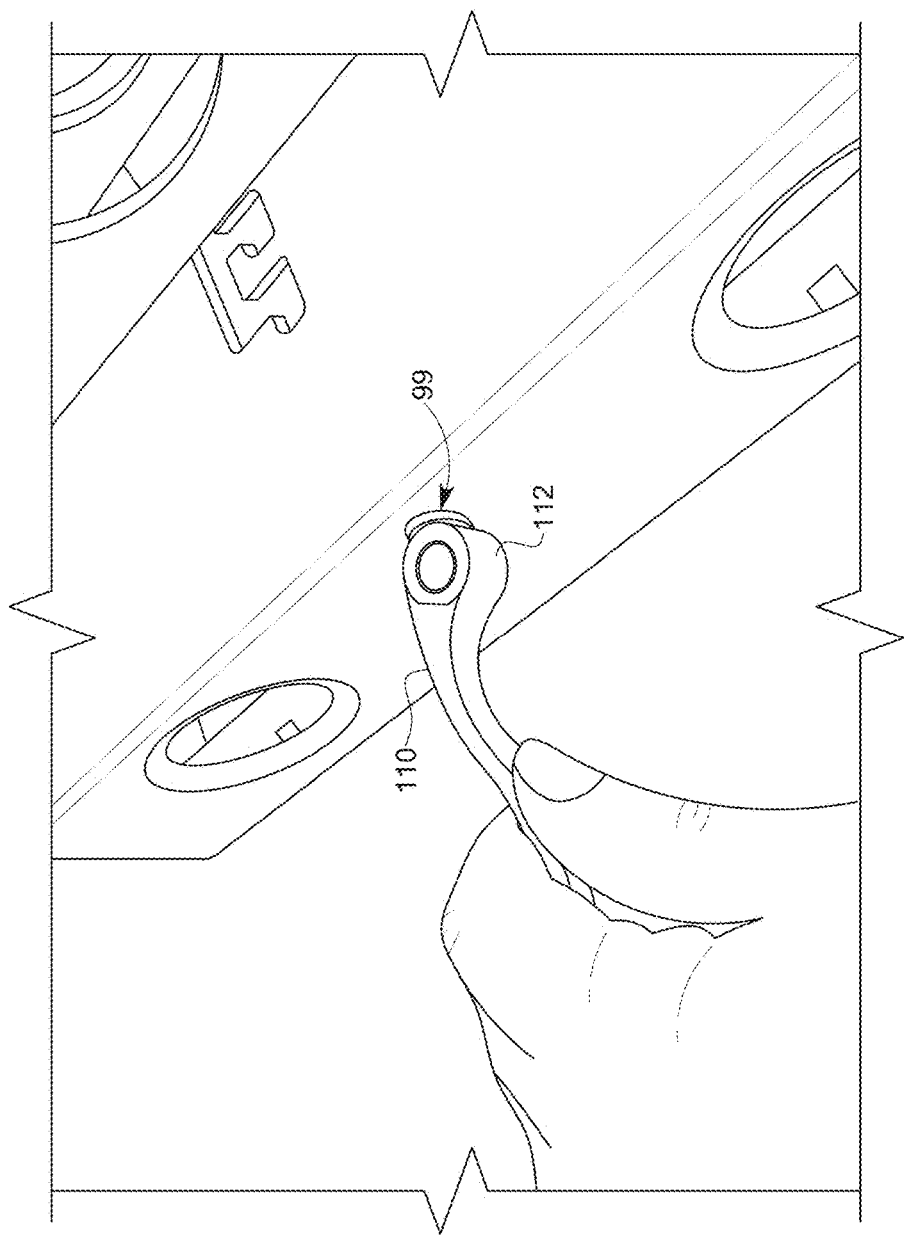
FIG. 15 is a perspective view of the linear actuator crank handle and cam lock mechanism.

FIG. 14 shows the rod 92 adjacent the second jaw 70 and jaw plate 72. The rod 92 passes through a first flange 30 through a bushing 99. FIG. 15 shows the linear actuator crank handle 110 in a mid-lever position. The actuator handle 110 is used to turn the actuator rod 92 to drive the first jaw. The handle 110 is pilotable and has a cam surface 112 to effectively lock the rod in place at a desired position.

A preferred linear drive mechanism is a VERITAS cam action lever system No. 05J5101. The cam lever houses a ⅜" diameter by ½" length dowel that is drilled and tapped to accept a ¼ inch, 20 threaded rod. About ⅜ inches of the rod is threaded at the lever side and about 10 inches of the other end are threaded underneath the first jaw. Two nylon flange bearings are inserted in pre-drilled holes at the end of the frame and through the hole of the downwardly extending tab 80 of bracket 75 (FIG. 10). The spring is compressed with locking collar 98 (FIG. 13).

A cam crank manually rotates the screw. The crank is rotated to secure the receptacle between the jaws and then pivoted to actuate the cam to lock the handle and the jaw, and thereby lock the cooler or receptacle between the jaws. Optionally, an electric motor may be used in place of a manually operated cam crank.

Operation

A typical use of the holder 10 is to secure a thermal cooler onto a truck bed as shown in FIG. 1. After the holder 10 is secured to the truck bed (FIG. 6), the jaws 50 and 70 are spaced a distance apart sufficient enough to place a cooler between. Preferably, the cooler is placed at approximately the center of the holder, regardless of the cooler size. Next, the second jaw is manually moved along the second guide slot 42 until the jaw inner surface 52 contacts the cooler. The second jaw is then locked into place by moving the jaw pins 74 into adjacent holes 44 of the second guide slot 42. Next, the linear actuator 90 is used to move the first jaw 50 into engagement with the opposing end of the cooler. Appropriate holding pressure may be applied by turning the actuator crank handle, and then locking the handle in place with the cam lock. To release the cooler from the holder, the crank handle cam is released and the spring 90 biases the jaws open to allow the actuator to be "unscrewed" easily to release the clamping pressure and separate the jaws.

The descriptions of specific embodiments of the invention herein are intended to be illustrative and not restrictive. The invention may be practiced otherwise than as specifically explained and illustrated without departing from its spirit or scope as defined by the appended claims.

What is claimed is:

1. An adjustable receptacle retainer for attachment to a vehicle, the retainer comprising:
   (a) a frame having a base plate with a top surface and a first flange extending downwardly from the top surface of the base plate to provide spacing between the base plate and a vehicle surface, the base plate having a first elongated guide slot,
   (b) first and second jaws mounted on the base plate, the first jaw movable relative to the second jaw and relative to the base plate along the first guide slot,
   (c) a linear actuator secured to the frame, the linear actuator drivingly attached to the first jaw to move the first jaw relative to the second jaw and relative to the base plate along the first guide slot,
   (d) a locking mechanism for locking the linear actuator to secure the first jaw in a spaced relationship relative to the second jaw.

2. A receptacle retainer as defined in claim 1 wherein the linear actuator is generally aligned with the first guide slot and mounted on the underside of the base plate in the space provided by the first flange.

3. A receptacle retainer as defined in claim 1 further comprising an elongated guide block attached to the first jaw, the guide block positioned in the first guide slot.

4. A receptacle retainer as defined in claim 1 wherein at least one of the first and second jaws comprises an inside surface extending generally perpendicular to the base plate, the inside surface having an anti-skid layer, an outside surface spaced from and generally parallel to the inside surface, and peripheral bridge connecting the peripheral edges of the inside and outside surfaces, wherein each of the inside and outside surfaces have central openings to allow clearance for a drain plug of a receptacle, and wherein the peripheral bridge includes a drain opening adjacent the base plate, and wherein the outside surface includes an opening with a inwardly extending bottle opening flange.

5. A receptacle retainer as defined in claim 1 wherein the linear actuator is a screw mechanism having a manual crank for rotating a screw and a cam for locking the crank.

6. A receptacle retainer as defined in claim 1 wherein the frame further comprises a plurality of first flanges extending downwardly from the top surface of the base plate to provide spacing between the base plate and a vehicle surface.

7. A receptacle retainer as defined in claim 6 further comprising a plurality of second flanges, each of the second flanges attached to one of the first flanges, each of the second flanges spaced from the base plate and extending substantially parallel to the base plate.

8. A receptacle retainer as defined in claim 7 wherein the plurality of second flanges extend under the base plate, and wherein each of the plurality of second flanges defines a series of spaced bolt openings, and wherein the base plate further comprises openings in the top surface substantially aligned with and positioned above the bolt openings to allow access to the bolt openings through the base plate openings.

9. A receptacle retainer as defined in claim 1 wherein the first jaw comprises a top plate adjacent the top surface of the base plate and a bottom plate positioned under the base plate, and two pins attaching the first jaw top plate and bottom plate, the two pins extending through the first guide slot, wherein the first jaw bottom plate includes a nut for drivingly engaging a screw drive.

10. A receptacle retainer as defined in claim 9 wherein further comprising a bracket attached to the under surface of the base plate, the bracket including a guide for the linear actuator screw, the guide aligned with the first guide slot, where the linear actuator further comprises a spring biased against the bracket guide to facilitate release of the linear actuator.

11. A receptacle retainer as defined in claim 1 wherein the base plate further comprises a second guide slot parallel to the first guide slot and spaced from and generally linearly offset from the first guide slot.

12. A receptacle retainer as defined in claim 11 wherein the second jaw is movable relative to the first jaw and relative to the base plate along the second guide slot.

13. A receptacle retainer as defined in claim 12 wherein the second guide slot comprises a series of linearly spaced detents generally linearly aligned with the first guide slot.

14. A receptacle retainer as defined in claim 13 wherein the second jaw comprises a first pin for positioning in a first detent to secure the second jaw relative to the base plate.

15. A receptacle retainer as defined in claim 14 wherein the second jaw further comprises a second pin for positioning in a second detent to secure the second jaw relative to the base plate.

16. A receptacle retainer as defined in claim 15 wherein the second jaw comprises a top plate adjacent the top surface of the base plate and a bottom plate positioned under the base plate, the second jaw top plate and second jaw bottom plate being connected by the first and second pins, the bottom plate stabilizing the second jaw.

17. An adjustable receptacle retainer comprising:
(a) a frame having a base plate with first and second elongated guide slots, the first and second guide slots being parallel to each other and linearly offset with respect to each other,
(b) first and second jaws mounted on the base plate, the first jaw movable relative to the second jaw and relative to the base plate along the first guide slot, the second jaw movable relative to the first jaw and relative to the base plate along the second guide slot,
(c) wherein the first jaw is lockable in a position along the first guide slot, and
(d) wherein the second jaw is lockable in a limited number of positions along the second guide slot.

18. An adjustable receptacle retainer as defined in claim 17 wherein the second guide slot includes a series of linearly aligned and linearly spaced detents, the detents linearly aligned with the first guide slot to provide the limited number positions along the second guide slot.

19. An adjustable receptacle retainer as defined in claim 17 wherein the second guide slot includes a linearly extending slot portion and a series of linearly aligned and linearly spaced detents, each detent connected to the slot portion, the slot portion being offset from the first guide slot and the detents linearly aligned with the first guide slot to provide the limited number positions along the second guide slot.

20. An adjustable receptacle retainer comprising:
(e) a frame having a base plate with a top surface and first and second elongated guide slots,
(f) first and second jaws mounted on the top surface of the base plate, the first jaw movable relative to the second jaw and relative to the base plate along the first guide slot, the second jaw movable relative to the first jaw and relative to the base plate along the second guide slot,
(g) an block under the base plate, the block attached to the first jaw by a pin extending through the first guide slot, and
(h) a plate under the base plate, the plate attached to the second jaw by a pin extending through the second guide slot.

* * * * *